Feb. 2, 1960  V. H. SMITH  2,923,221
MAGAZINE FOR CUT FILM
Filed Jan. 24, 1958  4 Sheets-Sheet 1
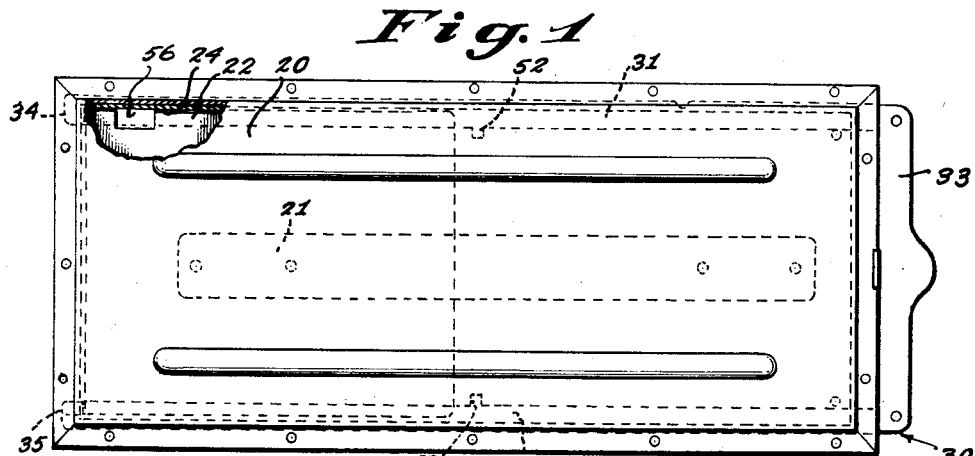
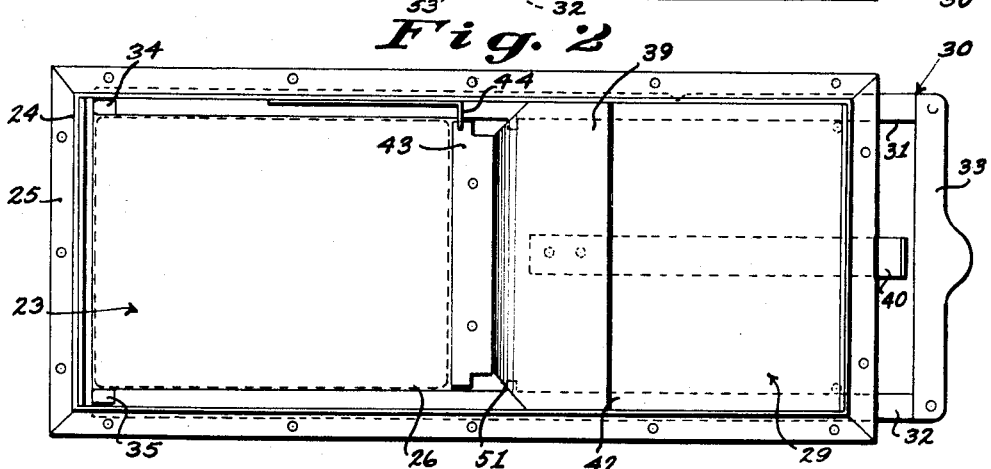
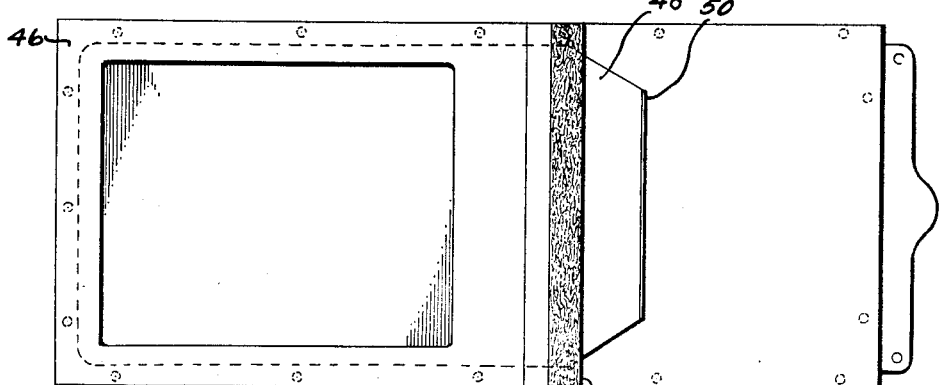
INVENTOR.
VALLEY H. SMITH
BY
Parrott & Richards
ATTORNEYS Feb. 2, 1960  V. H. SMITH  2,923,221
MAGAZINE FOR CUT FILM
Filed Jan. 24, 1958  4 Sheets-Sheet 2

INVENTOR.
VALLEY H. SMITH
BY
Parrott & Richards
ATTORNEYS

Feb. 2, 1960
V. H. SMITH
2,923,221
MAGAZINE FOR CUT FILM
Filed Jan. 24, 1958
4 Sheets-Sheet 3
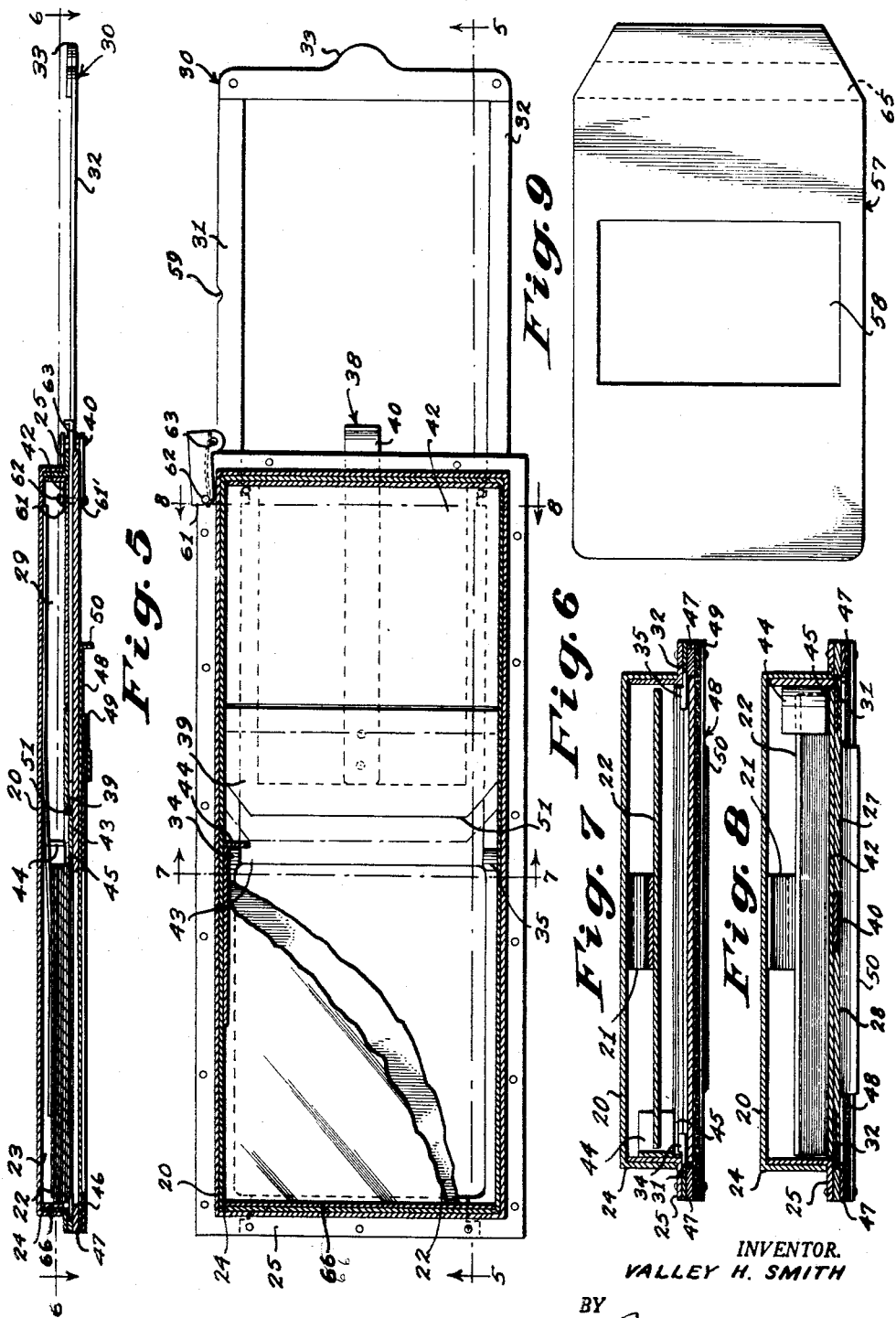
INVENTOR.
VALLEY H. SMITH
BY
Parrott & Richards
ATTORNEYS

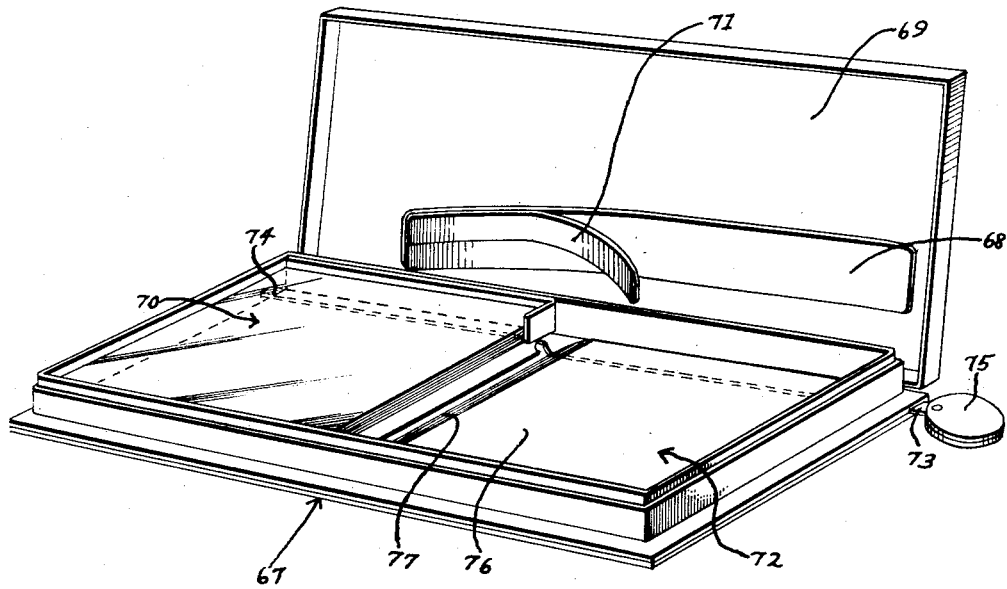

United States Patent Office 2,923,221
Patented Feb. 2, 1960

2,923,221

MAGAZINE FOR CUT FILM

Valley H. Smith, Mount Holly, N.C., assignor to Ultramatic Film Magazines, Inc., a corporation of North Carolina Application January 24, 1958, Serial No. 710,933

6 Claims. (Cl. 95—23)

This invention relates to a new magazine for cut film and more particularly, to a new two-chamber magazine adapted to receive and carry a package of cut film as it comes from the manufacturer, including interleaving papers for sequential exposure of each sheet, and transfer of each exposed sheet of film to a second chamber for storage, by means of an inexpensive, practical, and highly efficient mechanism.

One of the principal advantages of my invention is that the exposure chamber of the magazine will receive a plurality of sheets of cut film at a time, e.g., as many as 25, 50 or more, as desired, packed exactly as it comes from the manufacturer, normally with sheets of interleaving paper between individual films. There is provided a second chamber, adjacent the first, and constructed in communication therewith. As each sheet of film is exposed, it, together with its accompanying sheet of interleaving paper, can be transferred to the second chamber, sliding in front of the sheets previously exposed and transferred, by a simple lateral movement of the extractor mechanism, and almost instantaneously.

The cut film holders heretofore in general use are adapted to hold only two sheets of film at a time, and their use, particularly insofar as loading and unloading are concerned, is time consuming and expensive. Previous attempts to provide holders which will carry a plurality of cut film sheets in a single chamber are objectionable in that they require septa between each sheet of film, and also are cumbersome and time consuming to load.

Finally, prior attempts to provide a separate storage chamber for exposed film in connection with the film magazine have proved unsuccessful, requiring as they do, a complex and necessarily expensive mechanism for transfer of the film, without resulting in any considerable added convenience or saving of time. In addition, some have parts which are susceptible to wear, such as those which are provided with flexible sack or pouch-like receptacles for the exposed film.

Other advantages will become apparent in the following description of the embodiment of my invention illustrated in the accompanying drawings, in which:

Fig. 1 is an elevational rear view of the magazine of my invention;

Fig. 2 is a rear elevational view, corresponding to that of Fig. 1, with the cover removed;

Fig. 3 is a front elevational view;

Fig. 5 is a cross sectional view;

Fig. 6 is a rear view partly in section, taken on the lines 6—6 in Fig. 5;

Fig. 7 is a cross sectional view, taken on the lines 7—7 in Fig. 6;

Fig. 8 is a sectional view taken on the lines 8—8 in Fig. 6;

Fig. 9 is a rear elevational view of a supplementary dark slide illustrating a modification of my invention; and Fig. 10 is a perspective view of a further modification of my invention.

Figure 4:
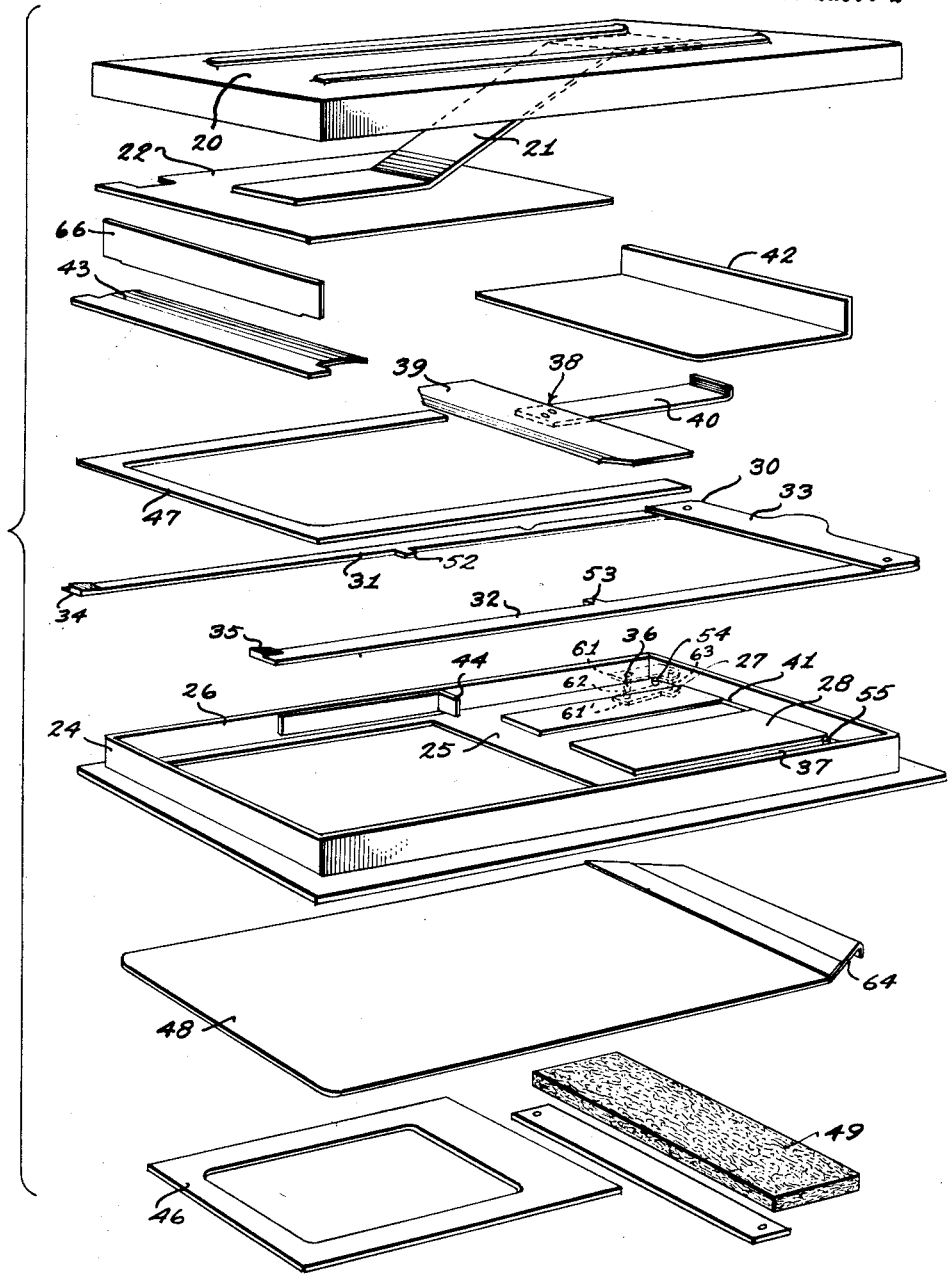
Fig. 4 is a perspective view of the various parts comprising the magazine of my invention prior to assembly.

Referring now to Fig. 4, it will be seen that the new magazine of my invention is provided with a rearward cover 20, to the inside of which is attached a spring 21. The spring 21 is attached to a pressure plate 22, which is adapted to fit into the chamber 23 for unexposed film (hereinafter referred to for convenience as "exposure chamber" 23), and press against the rearmost sheet of unexposed film. The cover 20 is designed to fit removably over the frame 24, in such a manner as to insure that when the cover 20 is in place no light is admitted to either chamber, a center plate 25 is rigidly secured to frame 24. Said center plate is provided with a cutaway portion or opening 26 at the front of the exposure chamber 23, to allow for exposure of the film. Said center plate 25 is also provided with raised portions or plates 27 and 28, at the forward portion of the storage chamber 29. An extractor 30 is provided for lateral discplacement of the single sheets of exposed film, said extractor consisting of guide arms 31 and 32 and joined at one end by a stop arm 33. The guide arms 31 and 32 are provided at their free ends, opposite to said stop arm 33, with raised sloped portions or catches 34 and 35, extending from the rearward surface of the extractor 30 to a distance of about the thickness of a single sheet of film plus a single sheet of interleaving paper. When the extractor 30 is in assembled position, guide arms 31 and 32 are disposed for sliding movement in the space 36 and 37 between plates 27 and 28, respectively, and frame 24. A positioner 38, consisting of a positioner plate 39 and arm 40 are also provided at the forward portion of storage chamber 29, said positioner arm being adapted for sliding movement in the space 41 between plates 27 and 28. A storage chamber liner 42 fits securely over plates 27 and 28, guide arms 31 and 32 and positioner arm 40. Said storage chamber liner 42 is of substantially the same thickness as positioner plate 39 and limits the lateral outward movement of positioner plate 39 (Figs. 2, 5, and 6) furnishes a smooth surface for the forward portion of the storage chamber 29, and affords protection against the admission of light into the latter. The inward lateral movement of the positioner 38 is limited by abutment of the positioner arm 40 against stop 43 which extends from the inner edge of opening 26 in center plate 25 into the storage chamber 29 at least as far as the inner edge of positioner plate 39 when the latter is fully retracted.

The sole means provided for maintaining separation of the unexposed film from the exposed film is a film separator 44 in the form of a lip element or microguage suitably secured to frame 24 and extending a short distance inwardly from one side of frame 24 at a point approximately midway between the ends of frame 24. It will be understood that what have been referred to for purposes of convenience as exposure chamber 23 and storage chamber 29 are in open communication with one another and actually constitute a single chamber provided with means to maintain separation of two stacks of film.

It will be noted that there is a slight clearance slot 45 between the forward edge of separator 44 and the stop 43, sufficient to allow for passage therethrough of a single sheet of film and normally a single sheet of interleaving paper, but not sufficient to allow simultaneous passage of two or more sheets of film.

The width of the clearance slot 45 may be adjusted, by adjusting the position of film separator 44, so that only one sheet of film, and normally only one sheet of interleaving paper will pass through. However, the clearance is such that if failure should occur, and a sheet of interleaving paper should remain in front of the stack of unexposed film at the opening 26, the failure will be automatically corrected on the next extraction. The sheets of interleaving paper are relatively very thin, and it is possible for two such sheets together with one sheet of film to pass through clearance slot 45 at one time. On the other hand, the clearance will be so adjusted that it is impossible for two sheets of film to pass through the clearance slot 45 at one time.

Front plate 46 is rigidly secured on three sides to shim 47 which is in turn secured to center plate 25, and is provided with an opening in registry with center plate opening 26 to allow for exposure of the film, thus providing a pocket or slot to receive dark slide 48. At the unsecured end of said front plate 46, a light seal 49 consisting of felt or other similar material is affixed to the inner or rearward face of front plate 46, providing a flexible closure of said pocket, to prevent admission of light and consequent inadvertent exposure of the film. The dark slide 48 is removably mounted in said pocket and is adapted for lateral sliding movement therein. Said dark slide 48 is further provided with a curved gripping end 50 to allow for convenient insertion and removal of the dark slide 48.

Referring now to the operation of the new magazine of my invention, the cover 20 is removed, while the extractor 30 and positioner 38 are in the position illustrated in Figs. 1 and 3. A fresh package of unexposed cut film, with interleaving paper between each sheet of film, is placed in position in exposure chamber 23, and the cover 20 is replaced. The spring 21 causes the pressure plate 22 to press against the rearmost sheet of film, thereby resiliently urging the stack of film forward and toward the opening 26. The magazine is then inserted into position in the camera. The dark slide 48 is then removed. After exposure of the first sheet of film, the operator grips stop arm 33 to move the extractor 30 to the retracted position shown in Figs. 5 and 6. The catches 34 and 35 on guide arms 31 and 32 abut against the ends of the sheet of exposed film and the sheet of interleaving paper adjacent and to the rear of said exposed film, and carry said sheets toward the storage chamber 29. The lower edges of the said sheets adjacent the guide arm 31 pass through the clearance slot 45 between the film separator 44 and the guide arm 31.

The edge of the film passing through clearance slot 45 and moving toward storage chamber 29 strikes the curved end surface 51 of positioner plate 39, which extends above the rear surface of stop 43 for a distance about equal to the width of clearance slot 45 and approximately equivalent to the thickness of one sheet of film plus one sheet of interleaving paper. It will be noted that positioner plate 39 is formed with a portion cut away at the corner adjacent the film separator 44, so as to prevent contact between positioner plate 39 and film separator 44. As the retracting movement of guide arms 31 and 32 carrying the single sheets of exposed film and interleaving paper continues, the edge of the film abutting the curved end surface of the positioner plate 39 urges the positioner 38 toward the retracted position shown in Figs. 2, 5 and 6. The rear surface of stop 43 slopes forwardly, so that when the positioner plate 39 is in the retracted position shown in Figs. 2, 5 and 6, the curved end surface 51 of positioner plate 39 has moved away and to the front of the sheet of film. The film is thus enabled to slide easily over the surface of the positioner plate 39 and storage chamber liner 42. Projections 52 and 53 on guide arms 31 and 32, abut against extractor stop pins 54 and 55 on center plate 25, the fully retracted position shown in Figs. 5 and 6. It will be noted that in fully retracted position of the extractor 30, the catches 34 and 35 remain in the exposure chamber 23, in front of the next sheet of film, so that when the extractor is returned to the closed position, the catches will not encounter the film edge, but will slide freely over its front surface.

The operator, by pushing the stop arm 33 returns the extractor to the closed position shown in Fig. 1. During this return movement, the stop arm 33 strikes the exposed end portion of positioner arm 40 and urges it toward the original, or closed position, shown in Fig. 1.

A further advantageous feature of the magazine of my invention is that the stack of film in the storage chamber is always held at least slightly to the rear of the path of travel of the film from the exposure chamber. As has been pointed out above, the curved end surface of the positioner plate in closed position extends rearwardly of the rear surface of the stop, providing a raised portion which will prevent the forward sheet of exposed film in the storage chamber from lying in the same plane with the forward sheet of film in the exposure chamber when the positioner is in closed position. In other words, the inner end of the exposed film in the storage chamber, nearest the exposure chamber is held to the rear of the oncoming sheet of film from the exposure chamber. This arrangement assures that the film being transferred from the exposure chamber will not encounter an edge of the forwardmost sheet of film in the storage chamber, which might result in bending the film and temporary stoppage of the mechanism, but instead will slide easily in front of the film in the exposure chamber.

The entire operation as described above can be completed in less than one second, and the second sheet of film will be in position for exposure.

As a further advantageous feature of the embodiment of my invention described above, a notch or cutaway portion 56 may be provided in the lower edge of pressure plate 22, a short distance from the end, as shown in Fig. 1. When the last sheet of film has been transferred to storage chamber 29, the outer end of the pressure plate 22 will rest against the center plate 25, and the inner end against catches 34 and 35. As the extractor 30 is returned to the closed position, the catch 34 will fit into the notch 56 and further movement of the extractor in either direction will be prevented. Therefore, when the extractor in its return movement stops at the position shown in Fig. 2, the operator will know that the supply of unexposed film is exhausted.

A further modification of my invention is shown in Fig. 9 in the form of a supplementary dark slide 57. This supplementary dark slide 57 is provided with a rectangular opening or cutaway portion 58, which is located at a point intermediate the length of the supplementary dark slide 57, and is approximately one-half the size of the opening 26 in center plate 25.

When the magazine is inserted in the camera, the dark slide 48 is removed and the supplementary dark slide 57 is inserted in its place. When fully inserted, three sides of the opening 58 will be in registry with the sides of the opening 26, and the fourth side of opening 58 will lie approximately midway between the ends of opening 26. Thus when the supplementary dark slide 57 is in the fully inserted position, the opening 58 therein will permit exposure of only one-half a sheet of film at a given time.

After exposure of the first half of the sheet of film, as described just above, extractor 30 may be moved to an intermediate position approximately midway between the closed position shown in Fig. 1 and the retracted position shown in Fig. 6. The second half of this sheet of film will then be in position for exposure. Following exposure of this second half, the extractor 30 is moved to the fully retracted position shown in Fig. 6, thus transferring the sheet of film to the storage chamber 29. The extractor is then returned to the closed position shown in Fig. 1.

For convenience of operation when using the supplementary dark slide 57 as described just above, groove 59 may be formed in extractor guide arm 31 between stop arm 33 and projection 52, for the purpose of determining the correct intermediate position of the film. A temporary stop means 60, consisting of L-shaped members 61 and 61' pivotally secured to center plate 25 by pin 62, and joined at the free end by a second pin 63, which rests in groove 59 when the extractor arm is in the correct intermediate position, and is held there by spring tension until further outward pressure is exerted on extractor 30.

Dark slide 48 may be provided with a light seal 64 as shown in Fig. 4, and supplementary dark slide 57 with a light seal 65, as indicated in Fig. 9, the light seal in each case consisting of a strip of black cloth or fibrous material, secured to the inner or rearward surface of the slide.

I have found that it may be desirable to secure a suitable end plate 66 to the inner end of frame 24 in exposure chamber 23 opposite the rearwardly extending portion of storage chamber liner 42.

The magazine of my invention may also be provided with any one of a number of standard numbering devices, preferably of the plunger type, to enable the operator to ascertain the number of sheets of exposed film.

The further modification of my invention, illustrated in Fig. 10, is particularly useful in connection with cut film sold without interleaving paper, but adapted to be used with film dividers which are inserted by the operator between the sheets of film at the time the camera is loaded. This modified magazine, designated generally as 67, is of substantially the same construction as described hereinabove, except as will be pointed out below.

The spring 68 is mounted on the inner surface of the cover 69, and extends into the exposure chamber 70. However, in the present modification, a second U-shaped spring 71 is mounted on spring 68, said second spring 71 having its free end extending into the storage chamber 72, and adapted to resiliently urge the exposed film in the storage chamber 72, forwardly in said storage chamber 72.

The extracting means may, if desired, comprise a single extractor arm 73, formed with a catch 74, terminating in a single operating knob 75.

Similarly, if desired, in this modification the positioning means may consist of a single, fixed positioner plate 76, formed with a curved end surface 77, and extending therefrom substantially over the front of the storage chamber 72.

While my invention has been described above particularly in connection with cut film packaged with interleaving paper, it will be apparent that the invention is equally applicable to cut film packaged and used without interleaving paper, and to cut film adapted to be used with dividers. In the following claims, therefore, the term "film unit" shall be understood to refer either to a single sheet of film and accompanying sheet of interleaving paper, or divider, or to a single sheet of film.

Moreover, it will be understood that the magazine of my invention may be manufactured in any one of a number of various sizes, depending on the size of the film and/or the cameras.

The specific structure of my new magazine has been described above and shown in the accompanying drawings in one particular embodiment in detail for the purposes of illustration only, and my invention is not intended to be limited by this description or otherwise, except as defined in the appended claims.

I claim:

1. A magazine for cut film comprising a chamber consisting of a first compartment adapted to receive and carry a plurality of sheets of cut film, means disposed toward the rear of said first compartment resiliently urging said cut film forward toward an opening in the forward wall of said first compartment for exposure of single sheets of said film through said opening and a second compartment adapted to receive and carry exposed film, an extractor slideably disposed in said chamber having a portion extending through said chamber whereby said extractor may be manipulated manually, said extractor having catch means at the end remote from said portion adapted to carry a single film unit from said first compartment to said second compartment, separating means disposed between said compartments, a clearance slot adjacent said separating means adapted to permit passage therethrough of a single film unit, and film positioning means in said chamber including a slideable member having a film contacting end which positions the film in the first compartment and slides away from the first compartment when the film is being transferred, said film positioning means having an inclined surface portion which spaces the film previously disposed in the second compartment from the sheet being transferred and over which the sheet being transferred passes and is deflected to a position between the previously transferred film and the film positioning means.

2. A magazine for cut film comprising a chamber consisting of a first compartment adapted to receive and carry a plurality of sheets of cut film, means disposed toward the rear of said first compartment resiliently urging said cut film forward toward an opening in the forward wall of said first compartment for exposure of single sheets of said film through said opening and a second compartment adapted to receive and carry exposed film, a manually manipulatable extractor having at least a portion slidable in said chamber between closed and retracted positions, said extractor having catch means disposed at its end remote from said second compartment adapted to engage the edge of a single film unit adjacent said opening and carry said film into said second compartment, separating means for maintaining separation between the film in said first compartment and the film in said second compartment, a clearance slot to permit passage of said single exposed film unit, but preventing passage of more than one film unit at a time, and film positioning means having a portion slidably disposed in said chamber between closed and retracted positions, said slidable portion having an end disposed in the path of said film unit and which positions the film in the first compartment when the slideable portion is in the closed position, said slidable portion moving to a retracted position when the film is being transferred from the first compartment to the second compartment, said film positioning means having an inclined surface portion which spaces previously transferred film from the film unit being transferred thereby preventing edge-to-edge contact between said film unit and any film unit already disposed in said second compartment, said inclined surface portion thereby enabling said film unit to slide into position in said second compartment between said positioner and the last sheet of exposed film previously transferred.

3. A magazine for cut film as defined in claim 2, and in which said extractor engages a portion of said positioner as it is moved to closed position, thereby returning said extractor to closed position.

4. A magazine for cut film, as defined in claim 2, and in which a portion of said positioner projects outwardly from the housing of said chamber when said positioner is in retracted position, said portion being adapted for engagement with a portion of said extractor when the latter is returned to closed position, thereby assuring return of said positioner to closed position.

5. A magazine for cut film comprising a chamber consisting of a first compartment adapted to receive and carry a plurality of sheets of cut film, means disposed toward the rear of said first compartment resiliently urging said cut film forward toward an opening in the forward wall of said first compartment for exposure of single sheets of said film through said opening and a second compartment adapted to receive and carry exposed film, an extractor slideably disposed in said chamber having a portion extending through said chamber whereby said extractor may be manipulated manually, said extractor having catch means at the end remote from said portion adapted to carry a single film unit from said first compartment to said second compartment, separating means disposed between said compartments, a clearance slot adjacent said separating means adapted to permit passage therethrough of a single film unit, and film positioning means in said chamber, including a slideable member having a film contacting end which positions the film in the first compartment and is positioned by said film unit into retracted position, said film positioning means having an inclined surface portion which spaces the film previously disposed in the second compartment from the sheet being transferred and over which the sheet being transferred passes and is deflected to a position between the previously transferred film and the film positioning means.

6. A magazine for cut film comprising a chamber consisting of a first compartment adapted to receive and carry a plurality of sheets of cut films, means disposed toward the rear of said first compartment resiliently urging said cut film forward toward an opening in the forward wall of said first compartment for exposure of single sheets of said film through said opening and a second compartment adapted to receive and carry exposed film, an extractor slideably disposed in said chamber having a portion extending through said chamber whereby said extractor may be manipulated manually, said extractor having catch means at the end remote from said portion adapted to carry a single film unit from said first compartment to said second compartment, separating means disposed between said compartments, a clearance slot adjacent said separating means adapted to permit passage therethrough of a single film unit, and slideable film positioning means in said chamber having an inclined film contacting end which positions the film in the first compartment and is pushed by said film into a retracted position, said inclined end spacing the film previously disposed in the second compartment from the unit being transferred and the unit being transferred passing over the inclined end and deflected thereby to a position between the previously transferred film and the film position means.

References Cited in the file of this patent
UNITED STATES PATENTS

| | | |
|---|---|---|
| 417,045 | Juruick | Dec. 10, 1889 |
| 2,073,640 | Louritz | Mar. 16, 1937 |
| 2,483,578 | Gallistel | Oct. 4, 1949 |